（12) United States Patent
Ieropoulos et al.

(10) Patent No.: US 10,811,718 B2
(45) Date of Patent: Oct. 20, 2020

(54) MICROBIAL FUEL CELL, METHOD OF CONTROLLING AND MEASURING THE REDOX POTENTIAL DIFFERENCE OF THE FUEL CELL

(71) Applicant: University of the West of England, Bristol, Bristol (GB)

(72) Inventors: Ioannis Ieropoulos, Bristol (GB); John Greenman, Bristol (GB)

(73) Assignee: UNIVERSITY OF THE WEST OF ENGLAND, BRISTOL, Bristol (GB)

( * ) Notice: Subject to any disclaimer, the term of this patent is extended or adjusted under 35 U.S.C. 154(b) by 87 days.

(21) Appl. No.: 15/544,977

(22) PCT Filed: Feb. 1, 2016

(86) PCT No.: PCT/GB2016/050212
§ 371 (c)(1),
(2) Date: Jul. 20, 2017

(87) PCT Pub. No.: WO2016/120641
PCT Pub. Date: Aug. 4, 2016

(65) Prior Publication Data
US 2018/0013162 A1    Jan. 11, 2018

(30) Foreign Application Priority Data
Jan. 30, 2015   (GB) .................... 1501570.4

(51) Int. Cl.
*H01M 8/16*     (2006.01)
*H01M 8/0612*   (2016.01)
*H01M 8/04537*  (2016.01)

(52) U.S. Cl.
CPC ......... *H01M 8/16* (2013.01); *H01M 8/04552* (2013.01); *H01M 8/04582* (2013.01); *H01M 8/0612* (2013.01); *Y02E 60/527* (2013.01)

(58) Field of Classification Search
CPC ............. H01M 8/16; H01M 8/04552; H01M 8/04582; H01M 8/0612; Y02E 60/527
See application file for complete search history.

(56) References Cited

U.S. PATENT DOCUMENTS

2012/0132521 A1   5/2012   Silver et al.
2013/0048498 A1   2/2013   Dasgupta et al.
2015/0349350 A1*  12/2015  Liu .................... H01M 8/0239
                                                          429/2

FOREIGN PATENT DOCUMENTS

CN        104091962 A        10/2014
GB          2500663 A        10/2013
                (Continued)

OTHER PUBLICATIONS

European Patent Office, International Search Report issued in corresponding Application No. PCT/GB2016/050212, dated Jul. 19, 2016.

(Continued)

*Primary Examiner* — Raymond Alejandro
(74) *Attorney, Agent, or Firm* — Stites & Harbison, PLLC; Mandy Wilson Decker

(57) ABSTRACT

A microbial fuel cell (MFC) in which the anode and/or cathode half-cell comprises at least one additional electrode insulated from direct contact with the working electrode and arranged to be coupled to an external voltage or current source, wherein the additional electrode does not comprise an internal redox system, methods of operation of MFCs and methods for measuring, controlling or modulating MFC circuits are described.

16 Claims, 3 Drawing Sheets

(56) References Cited

FOREIGN PATENT DOCUMENTS

| WO | 01/04626 A1 | 1/2001 |
|----|-------------|--------|
| WO | 2012/096126 A1 | 7/2012 |
| WO | 2012168743 A2 | 12/2012 |

OTHER PUBLICATIONS

Menicucci, J., et al. "Procedure for Determining Maximum Sustainable Power Generated by Microbial Fuel Cells," Environmental Science & Technology, vol. 40, No. 3, Feb. 28, 2006, pp. 1062-1068.
Intellectual Property Office, Search Report issued in corresponding Application No. GB1501570.4, dated Nov. 20, 2015.

\* cited by examiner

MICROBIAL FUEL CELL, METHOD OF CONTROLLING AND MEASURING THE REDOX POTENTIAL DIFFERENCE OF THE FUEL CELL

FIELD OF INVENTION

The present invention relates to microbial fuel cells (MFCs), to methods of operation of MFCs and to methods for measuring, controlling or modulating MFC circuits. In particular, the invention relates to providing MFCs with improved power output and methods for measuring MFC or controlling circuits.

BACKGROUND TO THE INVENTION

Microbial fuel cells are devices that convert chemical energy to electrical energy by the catalytic reaction of microorganisms; virtually an organic material can be used feed the fuel cells, including coupling them to wastewater treatment plants. Microbial Fuel Cells have been in the centre of attention for at least 25 years, receiving increased amounts of focus during the last 6 years. The main driver for this is—in contrast with conventional fuel cells—the advantageous potential for continuous long-term, constant-power output levels, arising from the core of this technology; the living whole cell biofilm biocatalyst. The biocatalyst, which accelerates the rate of a chemical reaction, has the ability of performing so, without being consumed in the process. In most conventional fuel cells, catalysts can be exotic metals that enable the fuel disintegration into its main constituents, one of which is the electrons. In the case of Microbial Fuel Cells (MFCs) the biocatalyst is regenerated through the growth and cell metabolism of the mixed or pure cultures living within the anodic chamber. Provided that these microbial consortia are in a continuously 'refreshing' environment, they will remain viable, with constant numbers of attached metabolising and biotransforming biofilm cells, for months or years.

The MFC principle of operation is underlined by the laws of electrochemistry governing the electrical redox potential properties of matter, and is currently one of the setbacks in this field of science. MFCs, in most cases, consist of two separate half-cells; the anode (−ve terminal) and the cathode (+ve terminal). Depending on the 'ingredients list' going into the liquid or dry mixture of each half-cell, there will be a potential difference between the two, which will be the combination of each half-cell's individual redox values that are dictated by the standard redox potential of each of the components making up these systems. This is also known as the open-circuit (o/c) or no-load voltage of the system, since it can only be recorded when there is no load connected across the two terminals, and defines the force with which electrons, generated by the microbial biofilm cells at the anode, flow through a circuit (electrical load) into the cathode. Naturally, the higher this value is, the less likely it is to be a limiting factor. Thus far, the average o/c voltage level reported is ~0.7V, which effectively means that the voltage-ampere (VA) output of these systems will always be <1V and for applications requiring a typical 3-5V operating range, a number of these units must be employed and joined together. This relationship is independent of physical size and volume, i.e. the same potential difference will exist whether the total working volume is 1 mL or 10 L.

Connecting multiple units together, to achieve one high value of output, may be done in a number of ways. For example, like conventional batteries, MFCs can be connected in series or in parallel, to step-up the voltage or the current respectively. If both these parameters need to be amplified, then a series-parallel configuration may be applied. These methods are purely to do with the electrical amplification of power.

Open circuit potential measures the potential difference between the redox voltages of an anolyte and a catholyte of a MFC. In other words, redox potential difference is the difference between the redox potentials of two dissimilar substances (redox couples). This is the force that governs the flow of electrons in the MFC system. This force is maintained and regenerated by the metabolic drive of the microorganisms. When in energy generation mode, an external load is connected between the working anode and cathode electrodes, which allows the flow of charge (electrons) from the former to the latter. In order to quantify the open circuit voltage performance of a MFC, it is commonly the way to break the circuit (i.e. disconnect the resistor) and allow for a steady state reading to be established or by using a potentiostat, which artificially sets the system to a steady state using a reference electrode. However, it takes time for a steady state to be reached (about half an hour is not unusual). Continually breaking the circuit and waiting for it to stabilize significantly disrupts the MFC power output.

There is therefore a need to improve power output from MFCs and provide improved mechanisms for a measurement that corresponds with the MFC open circuit potential and a method to control or modulate the power output from the working electrodes.

SUMMARY OF THE INVENTION

The inventors have surprisingly found that MFC power output can be improved by connecting a MFC to an external power source, via at least one additional electrode. In essence, an external power source (which may be another MFC), termed the driver, is connected to the working electrode and additional electrode, both found in the anode or cathode half-cell of a MFC unit, termed the working unit. Contrary to the conventional series and parallel configurations between multiple units, this is not a direct electrical effect, as the voltage output of the driver unit affects the electrochemical redox value of the working MFC anolyte, which in effect, positively affects the performance. This can have particular advantages when interconnecting multiple MFC units, due to the longer-term benefits gained from the dynamic shift of the redox conditions. The main (working) electrodes respond and are modulated by the shift in redox potential, which in turn is dependent on the magnitude of voltage-current applied via the additional electrode(s) (such as the $3^{rd}$ or $4^{th}$ pins).

The improved performance of the MFC can be seen in increased power output. Power output is the rate of work done and in the case of MFCs it can be calculated as the product between the current and the voltage under a known load.

The present invention also provides a method of controlling the redox potential of a microbial fuel cell, the method comprising adding at least one additional electrode to an anode and/or cathode half-cell, the additional electrode being insulated from direct contact with the working electrode and connected to an external voltage or current source. This method allows for measurement of the redox potential difference between the anode and cathode half-cells ('open-circuit' equivalent) from an operational MFC under load, without breaking the circuit and waiting for steady states to be reached. In preferred embodiments of the invention the additional electrode poises the anode toward a more negative redox potential and/or poises the cathode toward a more positive redox potential.

In preferred embodiments of the invention, the additional electrode is insulated from direct contact with the working electrode. Electrical insulation can be provided by an open-ended impermeable coat or a fully closed semi-permeable coat. Suitable coating materials include one or more of ceramic, polymeric plastic, silicone or rubber, or mixture thereof, which be impermeable or semi-permeable. Suitable semi-permeable coatings include semi-permeable fabric, intestinal skin, collagen and biodegradable organic matter, such as leaf material. In embodiments of the invention a biodegradable coat can be used as a hysteresis mechanism, keeping the additional electrode isolated from other electrodes in the MFC until the biodegradable coating degrades, allowing the additional electrode to become operational. The additional electrode therefore may comprise two coats, such as an inner non-biodegradable coat and an outer biodegradable coat.

The MFC may be either a direct contact-based (i.e. microbes such as *Geobacter, Shewanella, Rhodoferrax* are directly passing electrons to the electrode via conductive protein chains or nanowires) or a mediator-based WC (whereby the microbes such as *Desulfovibrio, Pseudomonas, Shewanella*, excrete electroactive metabolites that are chemically reduced and can be electrocatalytically oxidised at the electrode). The mediator may be natural or synthetic and can include one or more of sulphate/sulphide, ferric/ferrous, nitrate/nitrite, thionine, methyl viologen, methylene blue, humic acid, neutral red, naphthoquinones, phenazines and phenothiazines.

The WC preferably includes one or more ion exchange membranes. The ion exchange membrane may be a cation exchange membrane or an anion exchange membrane. Suitable ion exchange membranes also include Hyflon® ion membranes, synthesized collagen films, synthesized latex films and animal skin films. Preferably the ion exchange membrane is a proton exchange membrane (PEM). The PEM may be a polymer membrane or a composite membrane and suitable materials include, but are not limited to, Nafion®, Ultrex™, ceramic and earthenware. Preferably, the PEM is ceramic. The shape and arrangement of PEMs used in the MFCs of the present invention can vary depending on the design of the individual MFCs, however, when the PEM is ceramic a flat tile or a hollow cylindrical construction is preferred. When the PEM is cylindrical the anode can be inserted inside or outside the cylinder and the cathode can be wrapped around the exterior or interior of the cylinder.

The working electrodes may be formed from or comprise materials including carbon (e.g. folded carbon veil, activated carbon or carbon rods), graphite felt, graphite rods, metal including platinum and gold, metal composites, micro-porous-layer (MPL) electrodes, or conductive ceramic. The working electrodes may be metal coated. In embodiments of the invention the working electrode may be flat, mesh or branched (having rod-like surface projections). Flat or mesh electrodes may be any shape, for example, rectangular or circular or conformed as a cylinder with porous interior. The electrodes may be formed of strips of various thicknesses, wire of various diameters, mesh or net the like.

The additional electrode is placed into the same solution as the working electrode, without making direct physical contact with the working electrode. The additional electrode may comprise or be formed from the same conductive material as the working electrode or it may comprise or be formed from a different material from the working electrode. In embodiments of the invention the additional electrode may be formed from metal, carbon or ceramic, or may be metal coated.

In preferred embodiments of the invention the additional electrode does not comprise an internal redox system. This makes the additional electrode distinct from, e.g. a reference electrode used in a potentiostat, which requires a stable and known electrical potential in order to provide a consistent response to varying conditions for the purpose of comparison and characterisation. The stability of a reference electrode is provided by an internal redox system (chemical redox couple), often in the form of a liquid or gel encapsulated in the probe body. The additional electrode of the present invention does not require a known electrode potential as it acts simply to change the conditions of the half-cell in question and is not used as a characterisation tool.

The geometry of the additional electrode can vary depending on the design of the individual MFC. For example, the additional electrodes may be in the shape of small "pins" or "studs" or "sticks" with an insulated wire connection to the outside of the chamber to the driver MFC or alternate source of voltage charge. Typically, the surface area of the additional electrode is the same as or smaller than the surface area of the working electrode.

The external voltage or current source may be provided by one or more of an additional microbial fuel cell or any other external circuit supplying low power, such as a domestic mains supply, wind power, photovoltaics, hydropower, a battery, an accumulator or a chemical fuel cell Preferably at least the anode half-cell or at least the cathode half-cell comprises an additional electrode, or both the anode half-cell and the cathode half-cell comprise an additional electrode. In embodiments of the invention the anode and/or cathode half-cell may comprise two or more or three or more additional electrodes.

The ratio of the macro-surface area of the additional electrode to the volume of the half-cell containing the electrode may be from about 1:1 to about 1:50, preferably from about 1:1 to about 1:25, more preferably from about 1:1 to about 1:10. For example, the additional electrode may have a surface area of about 10 $cm^2$ in a half-cell having a volume of about 10 cc, or a surface area of about 10 $cm^2$ in a half-cell having a volume of about 25 cc, or a surface area of about the 10 $cm^2$ in a half-cell having a volume of about 100 cc. The surface area of the additional electrode may be from about 1 $cm^2$ to about 50 $cm^2$, preferably about 5 $cm^2$ to about 20 $cm^2$. Macro-surface area (as opposed to micro) refers to the macro scale, and refers to the area measured visibly with a ruler. In contrast, micro-surface area requires electronic microscopy to be accurately quantified, or via electrochemical techniques of absorption.

A plurality of MFCs can be connected by time-division multiplexing. In this way the MFCs alternate between acting as the driver and the working MFC. Preferably when a plurality of MFCs are connected to form a stack both the anode half-cell and the cathode half-cell of the MFCs comprise at least one additional electrode.

In a further embodiment, the present invention additionally provides a method for measuring a microbial fuel cell redox potential difference, the method comprising adding at least a first additional electrode to the anode half-cell and a second additional electrode to the cathode half-cell, the additional electrodes being insulated from direct contact with the working electrodes and not comprising an internal redox system, and measuring the redox potential difference across the first and second additional electrodes. The voltage or current of the microbial fuel cell circuit may be measured across the first and second additional electrodes.

The present invention additionally provides a method for exerting rapid modulatory control of networks, groups or stacks of MFCs by secondary circuits. The modulatory control can be in the form of amplification or attenuation to correspondingly increase or decrease the power output from the MFCs. The secondary circuits can be provided by any external voltage or current source such as a microbial fuel cell or any other external circuit supplying low power, such as a domestic mains supply, wind power, photovoltaics, hydropower, a battery, an accumulator or a chemical fuel cell. Preferably the secondary circuit is provided by one or more MFCs.

BRIEF DESCRIPTION OF THE DRAWINGS

Embodiments of the invention will now be described, by way of example only, with reference to the accompanying drawings FIGS. 1 to 3B, of which:

FIG. 3A shows an increase of ~80% as a result of poising through a carbon 3rd pin (same material as anode). FIG. 3B shows a 10-fold increase in the current output of an identical MFC, poised by a smaller (driver) MFC through an aluminium 3rd electrode (dissimilar to the anode) and the effect of disconnecting the driver MFC.

DESCRIPTION

Figure 1:
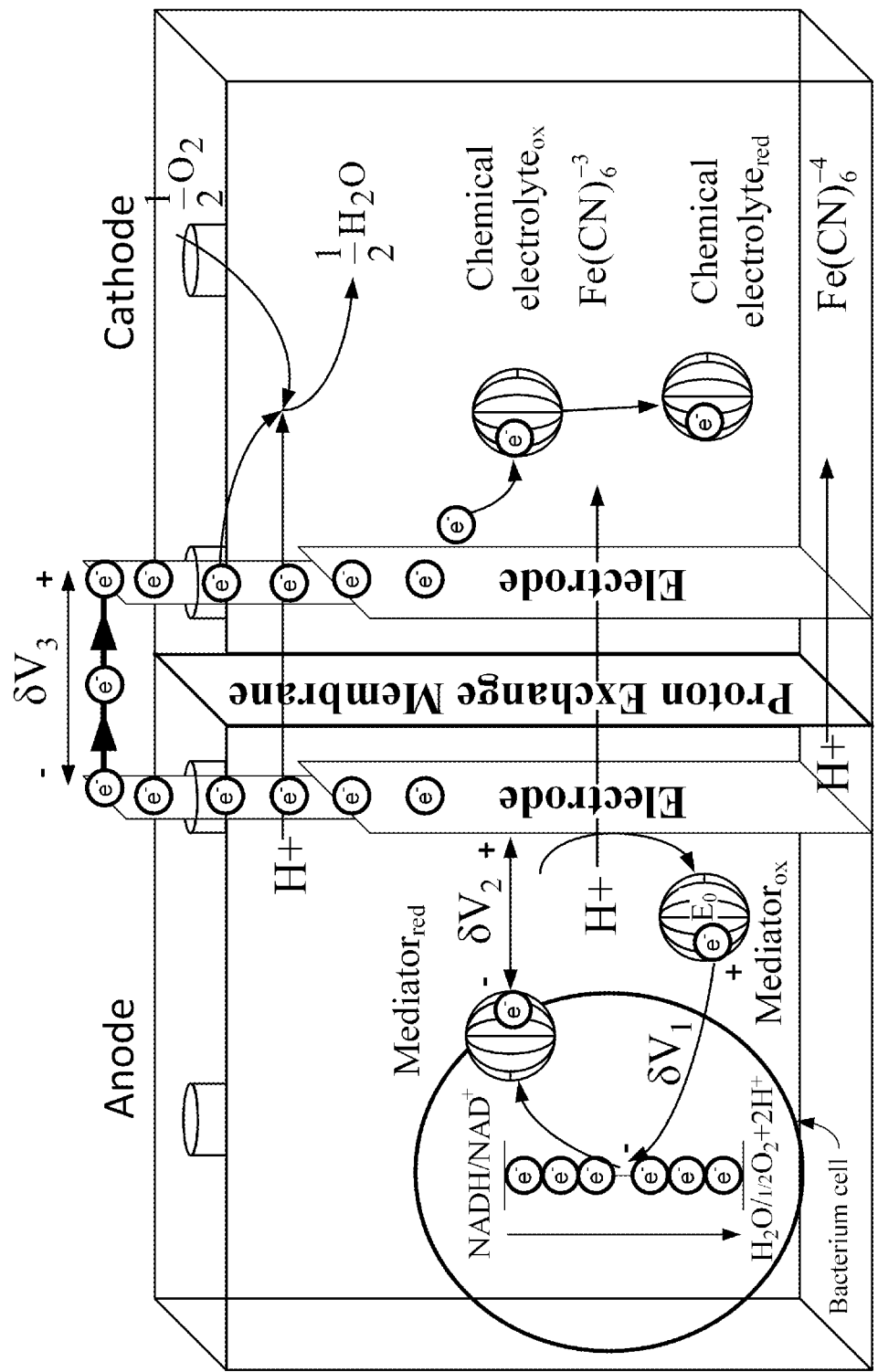
FIG. 1 is a schematic representation of electrochemical reactions within the anode and cathode of a mediator-based MFC. The + and − signs indicate the direction of electrons.

As shown in FIG. 1, within the mediator-based MFC, (natural or synthetic) three distinct redox potential differences exist for the system to work. The first of these is between the oxidised form of the mediator and the biological electron carrier within the bacterium cell ($\delta V_1$). Once the mediator intercepts the electron transport chain and becomes reduced (gains electrons) there is a potential difference between the reduced form of the mediator and the anode electrode ($\delta V_2$). Due to the dissimilarity between the two electrolytes (anolyte and catholyte) there is a third redox potential difference between the anode and cathode terminals ($\delta V_3$).

These redox potentials can be optimised by poising toward a more +ve or more −ve redox value using the MFCs of the present invention. For example, poising the anode half-cell toward a more negative value, resulting in a greater difference between the anode half-cell and the cathode, results in a greater number of electrons flowing through the circuit and hence a greater power output.

Figure 2:
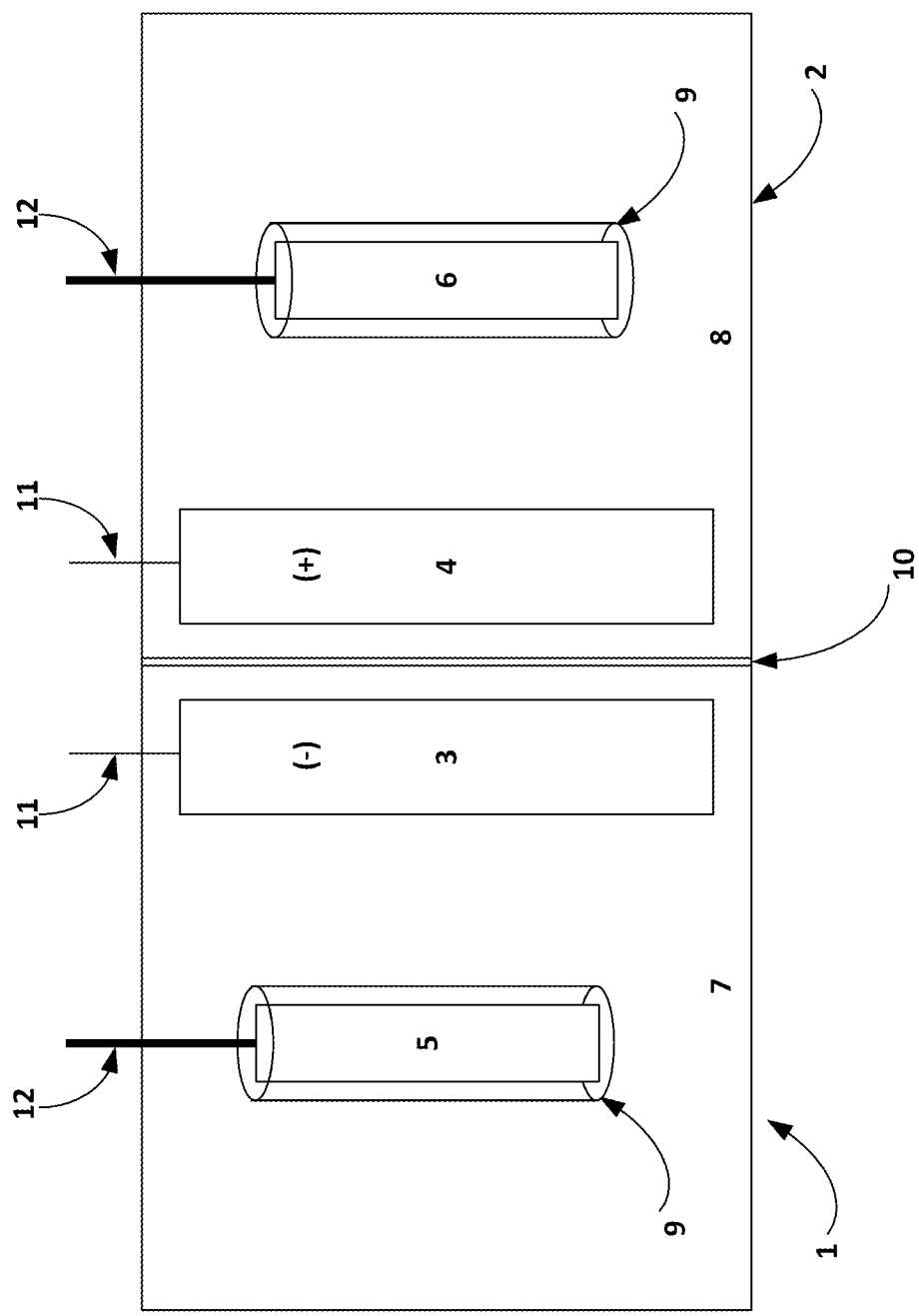
FIG. 2 is a schematic representation of a standard MFC with two compartments (half-cells) and 4 electrodes.

FIG. 2 shows a MFC according to one embodiment of the invention with two compartments (half-cells) and four electrodes. The MFC comprises an anode half-cell 1, containing anode liquid electrolyte (anolyte) 7 and a cathode half-cell 2, containing cathode liquid electrolyte (catholyte) 8. Electrodes 3 and 4 are the standard anode and cathode working electrodes, connected to un-insulated or insulated wire 11. Electrode 5 is the $3^{rd}$ electrode and electrode 6 is the $4^{th}$ electrode, each being connected to insulated electrical wire 12. The anode working electrode is by default negatively charged and the cathode working electrode is by default positively charged.

Anode half-cell 1: The addition of a smaller similar or dissimilar metal or conductive non-metal electrode 5 into this compartment allows the electrochemical poising—and hence the control—of the anolyte 7 to a more negative redox value or to any value for a desired electrochemical reaction. This can be done by any conventional voltage or current source, however, this can also be realised by using another MFC. This connection might involve the inclusion of resistors or diodes. The smaller or equal surface area 3rd and/or 4th electrode is insulated by an open-ended impermeable coat or indeed a fully closed semi-permeable coat 9. This is to stop the 3rd and/or 4th electrodes from having direct contact with the working electrodes—especially important for a small scale MFC—but to allow the electrochemical poise to still take place.

Cathode half-cell 2: The addition of a smaller similar or dissimilar metal or non-metal electrode 6 into this compartment allows the electrochemical poising—and hence the control—of the catholyte 8 to a more positive redox value or to any value for a desired electrochemical reaction.

The 3rd and 4th electrodes provide junctions for electrochemical control of a MFC, and also provide novel connection points for modulatory control of multiple MFC units as stacks.

Figure 3B:
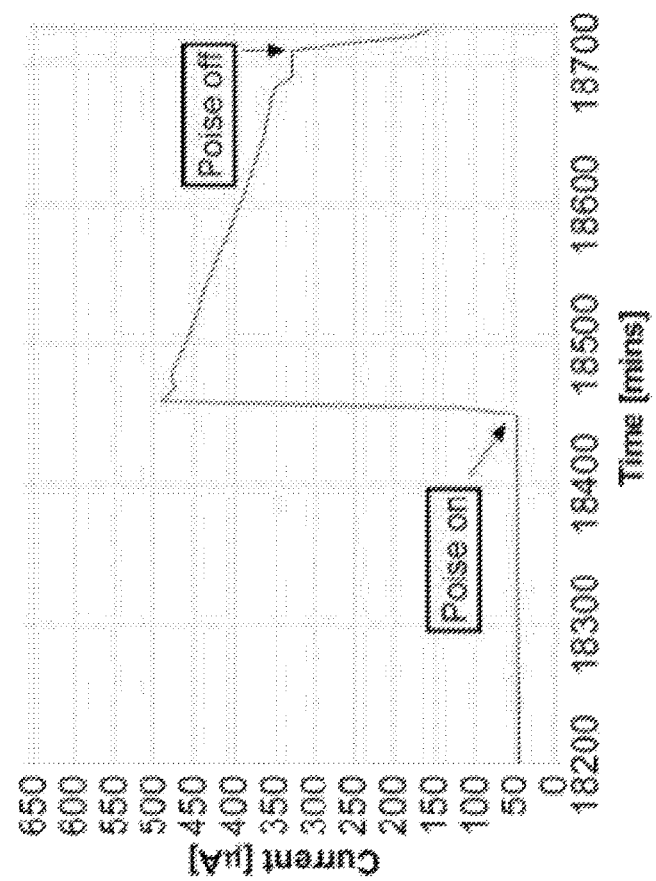
FIGS. 3A and 3B show data produced from experiments where a 3rd electrode (anode half-cell) is used.
Figure 3A:
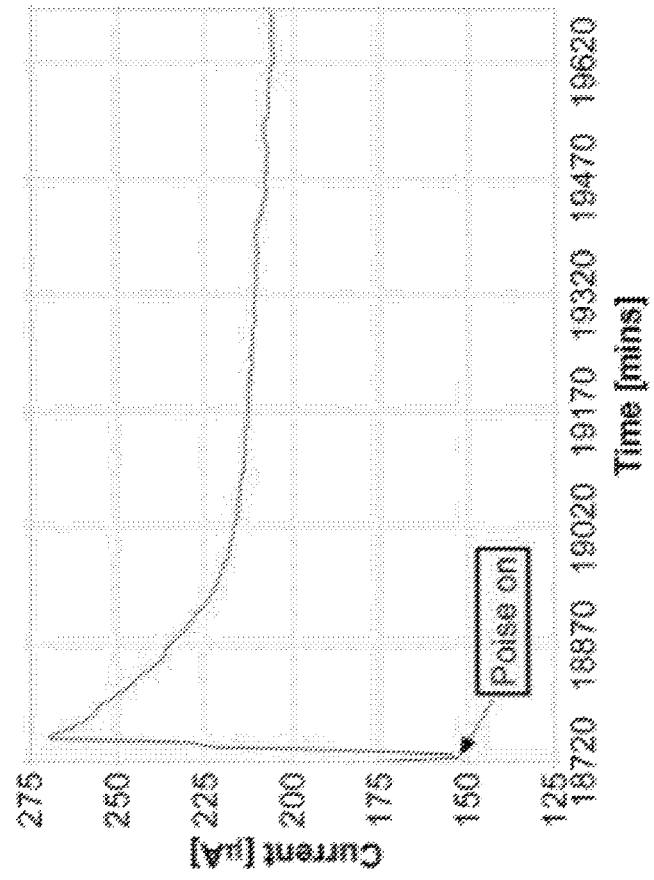

FIGS. 3A and 3B show data produced from experiments where only a 3rd electrode (in the anode half-cell) is used. FIGS. 3A and 3B show a remarkable increase in the power output of two different individual MFCs, after being poised by a separate smaller (driver) MFC, via the additional electrode (3rd electrode) in the anode. FIG. 3A shows an increase of 80% as a result of such poising through a carbon 3rd pin (same material as anode). FIG. 3B shows a 10-fold increase in the current output of an identical MFC, poised by a smaller (driver) MFC through an aluminium 3rd electrode (dissimilar to the anode) and the effect of disconnecting the driver MFC. These novel findings have opened up a whole new field of MFC modulation and control towards favourable redox conditions for maximum performance.

Also noted were the effects of switching on and off the third or fourth pin electrodes in terms of speed and decay of the MFC response, noting that the response is in terms of seconds rather than hours (important feature of modulation). This is due the electrodes acting electrochemically to boost the redox potential across the half-cells, rather than acting on the microbial population, which can take minutes or hours to react to a change in stimulus.

REFERENCES

Menicucci J1, Beyenal H, Marsili E, Veluchamy R A, Demir G, Lewandowski Z. Procedure for determining maximum sustainable power generated by microbial fuel cells. Environ Sci Technol. 2006 Feb. 1; 40(3):1062-8.

The invention claimed is:
1. A microbial fuel cell, comprising:
   (a) an anode half-cell and a cathode half-cell;
   (b) a working electrode in the anode half-cell and a working electrode in the cathode half-cell;
   (c) at least one additional electrode in the anode half-cell and/or at least one additional electrode in the cathode half-cell, wherein the at least one additional electrode is electrically-insulated from direct contact with the working electrode;
   (d) wherein the at least one additional electrode comprises a junction and a connection point for electrochemical modulatory control of the microbial fuel cell that can be coupled to an external voltage or current source to change the conditions of the half-cell comprising the additional electrode by poising toward a more-positive or negative redox value, and does not comprise an internal redox system.

2. The microbial fuel cell according to claim 1, and further comprising electrical insulation of the at least one additional electrode provided by an open-ended impermeable coat or a fully closed semi-permeable coat.

3. The microbial fuel cell according to claim 2, wherein the open-ended impermeable coat or the fully closed semi-permeable coat comprises one or more ceramic, polymeric plastic, silicone or rubber or wherein the fully closed semi-permeable coat comprises one or more semi-permeable fabric, intestinal skin, collagen, or biodegradable organic matter.

4. The microbial fuel cell according to claim 1, wherein the surface area of the at least one additional electrode is the same as or smaller than the surface area of the working electrode.

5. The microbial fuel cell according to claim 1, wherein the at least one additional electrode comprises or is formed from the same material as the working electrode.

6. The microbial fuel cell according to claim 1, wherein the at least one additional electrode comprises or is formed from different material from the working electrode.

7. The microbial fuel cell according to claim 1, wherein the external voltage or current source is provided by one or more of an additional microbial fuel cell, a domestic mains supply, wind power, photovoltaics, hydropower, a battery, an accumulator or a chemical fuel cell.

8. The microbial fuel cell according to claim 1, wherein the anode half-cell and/or cathode half-cell comprises two or more additional electrodes.

9. The microbial fuel cell according to claim 1, wherein the ratio of a macro-surface area of the at least one additional electrode to the volume of the anode half-cell and/or cathode half-cell containing the at least one additional electrode is from about 1:1 to about 1:50.

10. The microbial fuel cell according to claim 1, wherein a plurality of the microbial fuel cells are connected by time-division multiplexing such that the microbial fuel cells alternate between acting as driver and working microbial fuel cells.

11. A method of controlling the redox potential of a microbial fuel cell according to claim 1, the method comprising adding at least one further additional electrode to an anode half-cell and/or cathode half-cell, the at least one further additional electrode being electrically-insulated from direct contact with the working electrode and connected to an external voltage or current source.

12. The method according to claim 11, wherein the at least one additional electrode poises the anode toward a more negative redox potential and/or poises the cathode toward a more positive redox potential.

13. The method according to claim 11, wherein the external voltage or current source is provided by one or more of an additional microbial fuel cell or any other external circuit supplying low power including, a domestic mains supply, wind power, photovoltaics, hydropower, a battery, an accumulator or a chemical fuel cell.

14. The method according to claim 11, wherein at least two microbial fuel cells are connected by time-division multiplexing.

15. A method of measuring a microbial fuel cell circuit including a fuel cell according to claim 1, the method comprising adding at least a first additional electrode to the anode half-cell and a second additional electrode to the cathode half-cell, the first and second additional electrodes being electrically-insulated from direct contact with the working electrodes and not comprising an internal redox system, and measuring the redox potential difference across the first and second additional electrodes.

16. The method according to claim 15, wherein the voltage or current of the microbial fuel cell circuit is measured across the first and second additional electrodes.

* * * * *